US010110627B2

(12) United States Patent
St. Pierre

(10) Patent No.: US 10,110,627 B2
(45) Date of Patent: Oct. 23, 2018

(54) ADAPTIVE SELF-OPTIMZING DDOS MITIGATION

(71) Applicant: Arbor Networks, Inc., Burlington, MA (US)

(72) Inventor: Brian St. Pierre, Acworth, NH (US)

(73) Assignee: Arbor Networks, Inc., Burlington, MA (US)

( * ) Notice: Subject to any disclaimer, the term of this patent is extended or adjusted under 35 U.S.C. 154(b) by 0 days.

(21) Appl. No.: 15/252,006

(22) Filed: Aug. 30, 2016

(65) Prior Publication Data

US 2018/0063187 A1 Mar. 1, 2018

(51) Int. Cl.
*H04L 29/06* (2006.01)

(52) U.S. Cl.
CPC ...... *H04L 63/1458* (2013.01); *H04L 63/0263* (2013.01); *H04L 63/1408* (2013.01); *H04L 63/1416* (2013.01); *H04L 63/1433* (2013.01)

(58) Field of Classification Search
CPC ............. H04L 63/1458; H04L 63/1416; H04L 63/1433
See application file for complete search history.

(56) References Cited

U.S. PATENT DOCUMENTS

| | | | | |
|---|---|---|---|---|
| 7,002,980 B1 * | 2/2006 | Brewer | ................... | H04L 47/10 370/229 |
| 7,768,911 B2 * | 8/2010 | Savagaonkar | ...... | H04L 63/1416 370/230 |
| 8,085,681 B2 * | 12/2011 | Raftelis | ............... | H04L 63/1441 370/235 |
| 9,118,711 B2 * | 8/2015 | Oliphant | ............... | G06F 21/554 |
| 9,215,208 B2 * | 12/2015 | Fraize | .................. | H04L 63/0227 |
| 2003/0026246 A1 * | 2/2003 | Huang | .................... | H04L 45/00 370/352 |
| 2004/0148520 A1 * | 7/2004 | Talpade | ............. | H04L 63/0227 726/22 |
| 2006/0253902 A1 * | 11/2006 | Rabadan | ............. | H04L 63/0227 726/13 |
| 2007/0110053 A1 * | 5/2007 | Soni | ..................... | H04L 63/0263 370/389 |
| 2007/0245417 A1 * | 10/2007 | Lee | ..................... | H04L 63/1458 726/22 |

(Continued)

*Primary Examiner* — Mahfuzur Rahman
(74) *Attorney, Agent, or Firm* — Locke Lord LLP; Scott D. Wofsy; Christopher J. Capelli

(57) ABSTRACT

A system for mitigating network attacks includes a protected network including a plurality of devices. The system further includes attack mitigation devices communicatively coupled to the protected network. The mitigation devices are configured to receive network data packets from external devices attempting to access protected devices in the protected network. The attack mitigation devices are further configured to periodically analyze effectiveness of each of a plurality of packet analysis sections. Each of the plurality of packet analysis sections includes a plurality of packet analysis instructions and is associated with a counter configured to count number of packets dropped by a corresponding analysis section. The attack mitigation devices are further configured to disable one or more of the plurality of packet analysis sections responsive to the performed analysis and to analyze the received network data packets by utilizing only enabled one or more of the plurality of the packet analysis sections.

16 Claims, 4 Drawing Sheets

(56) References Cited

U.S. PATENT DOCUMENTS

2013/0124754 A1* 5/2013 Kutscher ................ H04L 47/20
  709/235
2013/0212679 A1* 8/2013 Ansari ................ H04L 63/1416
  726/22
2014/0380488 A1* 12/2014 Datta Ray ........... H04L 63/1433
  726/25

* cited by examiner

ADAPTIVE SELF-OPTIMZING DDOS MITIGATION

FIELD OF THE INVENTION

Embodiments of the present invention relate generally to computer and network security, and, specifically, to adaptive self-optimizing distributed denial-of-service (DDOS) mitigation.

BACKGROUND OF THE INVENTION

A Denial of Service (DoS) attack is typically an attempt to make a network machine or network resource unavailable to intended users. Generally speaking, a DoS attack is an attempt to overwhelm the capacity of a server in order to interrupt or suspend functioning of network resources associated with the server. Traditional methods for detecting DoS attacks are typically based on monitoring incoming traffic and detecting the DoS attack based on an observation of a large increase in traffic, especially when a large portion of the traffic originates from a single IP address. In this case, mitigating the DoS attack includes filtering out the traffic identified as malicious.

A DDoS attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, DNS servers, etc. Examples of a DDoS attack include (but are not limited to): large quantities of raw traffic designed to overwhelm a resource or infrastructure; application specific traffic designed to overwhelm a particular service; traffic formatted to disrupt a host from normal processing; traffic reflected and/or amplified through legitimate hosts; traffic originating from compromised sources or from spoofed IP addresses; and pulsed attacks (which start/stop attacks). Further, it is to be understood DDoS attacks are typically categorized as: TCP Stack Flood Attacks (e.g., flood a certain aspect of a TCP connection process to keep the host from being able to respond to legitimate connections (which may also be spoofed)); Generic Flood Attacks (e.g., consists of a flood of traffic for one or more protocols or ports, which may be designed to appear like normal traffic which may also be spoofed)); Fragmentation Attacks (e.g., consists of a flood of TCP or UDP fragments sent to a victim to overwhelm the victim's ability to re-assemble data streams, thus severely reducing performance); Application Attacks (e.g., attacks designed to overwhelm components of specific applications); Connection Attacks (e.g., attacks that maintain a large number of either ½ open TCP connections or fully open idle connections); and Vulnerability Exploit Attacks (e.g., attacks designed to exploit a vulnerability in a victim's operating system).

DDoS attacks are notoriously difficult to defend against because a multitude of compromised systems are used to implement the attack. Typically, an attacker causes one compromised system (the DDoS "master") to identify and infect numerous other systems (DDoS "bots" or "botnets") to launch an attack against a single target. Like many other types of DoS attacks, the attacker can forge the source address of the flood packets originating from the bots without reducing the effectiveness of the attack. Determining and tracking the source of forged datagrams in destination-based routing systems is difficult given the premium on processing capacity to perform the packet diagnostics that are required to determine the source. In addition, investment in anti-DDoS technology leads to service providers becoming locked in to costly, proprietary solutions. Also, such proprietary solutions typically have a finite resource capacity, such as CPU capacity, bandwidth, etc. for mitigating DDOS attacks. When an attack against a protected network reaches the upper limit of available system resources, known attack mitigation solutions typically drop arbitrary network traffic without analysis. In other words, in this scenario, "good" traffic will be dropped along with the attack traffic, thus allowing the attack to succeed. As a result, service providers are unable to reliably and cost-effectively mitigate DDoS attacks.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a system for mitigating network attacks is provided. The system includes a protected network including a plurality of devices. The system further includes one or more attack mitigation devices communicatively coupled to the protected network. The attack mitigation devices are configured and operable to receive network data packets from external devices attempting to access protected devices in the protected network. The attack mitigation devices are configured and operable to periodically analyze effectiveness of each of a plurality of packet analysis sections. Each of the plurality of packet analysis sections includes a plurality of packet analysis instructions and is associated with a counter configured to count number of packets dropped by a corresponding analysis section. The attack mitigation devices are further configured and operable to disable one or more of the plurality of packet analysis sections responsive to the performed analysis. The attack mitigation devices are also configured and operable to analyze the received network data packets by utilizing only enabled one or more of the plurality of the packet analysis sections.

In another aspect, an attack mitigation device communicatively coupled to a protected network is provided. The attack mitigation device includes logic integrated with and/or executable by a processor. The logic is adapted to receive network data packets from external devices attempting to access protected devices in the protected network. The logic is further adopted to periodically analyze effectiveness of each of a plurality of packet analysis sections. Each of the plurality of packet analysis sections includes a plurality of packet analysis instructions and is associated with a counter configured to count number of packets dropped by a corresponding analysis section. The logic is further adopted to disable one or more of the plurality of packet analysis sections responsive to the performed analysis. The logic is also adopted to analyze the received network data packets by utilizing only enabled one or more of the plurality of the packet analysis sections.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
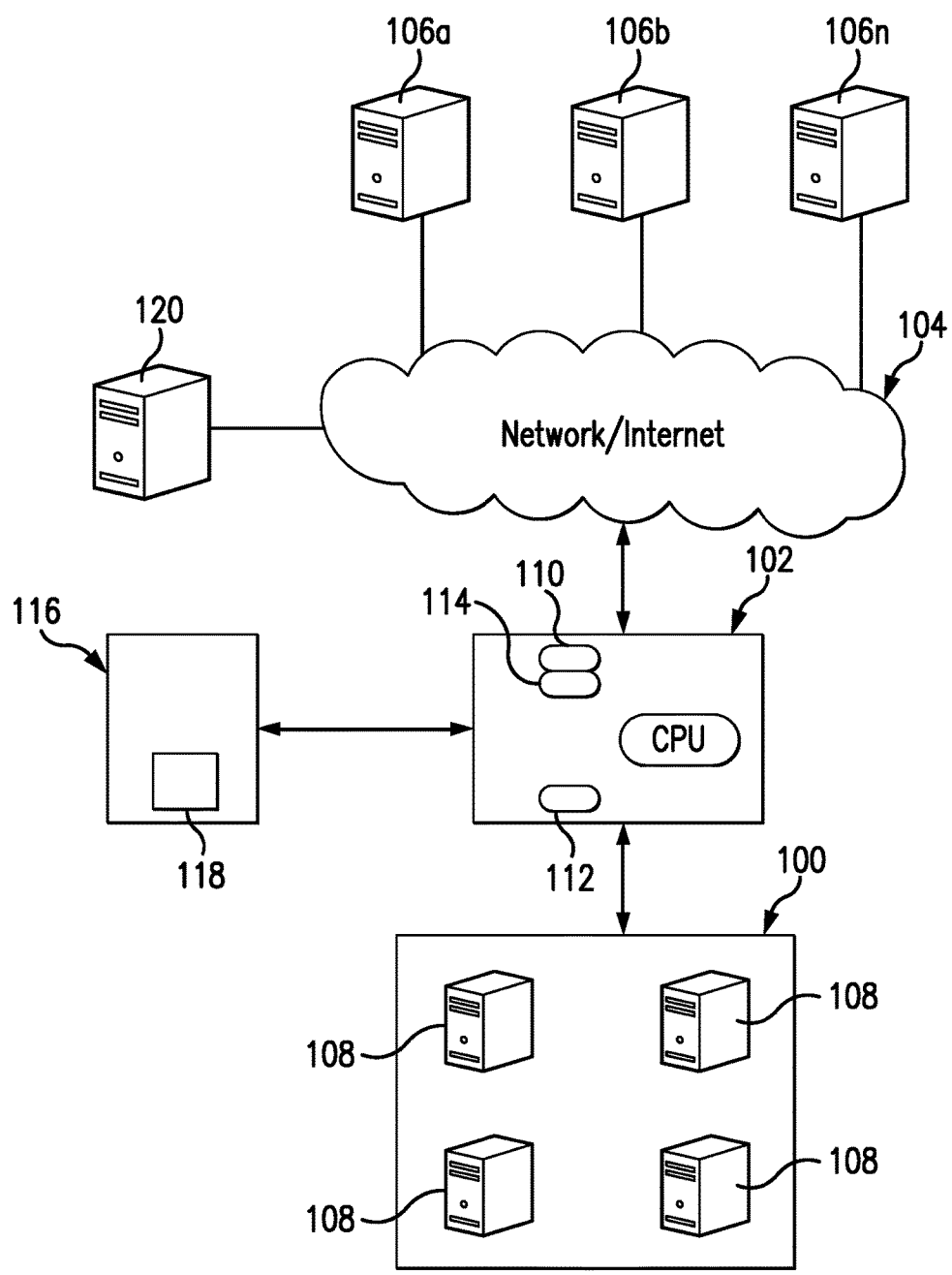
FIG. 1 is a schematic diagram showing network architecture and the relationship between the attack mitigation device and protected network according to one embodiment of the present invention.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

It is to be further understood the illustrated embodiments of the present invention describe a system, apparatus and method for avoiding and mitigating the harmful effects of a DDoS attack on a computer system/device or network.

Turning now descriptively to the drawings, in which similar reference characters denote similar elements throughout the several views, FIG. 1 illustrates the relationship between the protected network 100, attack mitigation device 102, Internet 104, and external host devices 106a, 106 b . . . 106 n.

In a typical implementation, the external host devices 106 a, 106 b . . . 106n (also referred to as external devices or host devices) attempt to connect to protected devices 108 within the protected network 100 typically via a private network or a public computer network such as the Internet 104. Examples of external host devices include servers, laptops, desktop computers, tablet devices, mobile phones, mobile computing devices, video games systems, televisions and other similar devices and systems having Internet connectivity.

In a preferred embodiment, the protected network 100 is protected by the attack mitigation device 102 preferably located between the Internet 104 and the protected network 100. Usually, the protected network 100 is an enterprise network, such as a school network, business network, and government network, to list a few examples. In other embodiments, the attack mitigation device 102 is located within the Internet, service provider network or enterprise network rather than as a network edge as illustrated. It is to be appreciated that when deployed within the protected network, traffic is diverted to the mitigation device 102.

The mitigation device 102 preferably includes a packet processing system preferably having an external high-speed network interface 110 and a protected high-speed network interface 112. Under current technology, these interfaces are capable of handling 1.0-100 Gbps, for example. The mitigation device 102 may further include processors 114 that preferably process the packets received at interfaces 110 and 112. Additionally, a central processing unit (CPU), random access memory (RAM), and a storage medium 116 are preferably used to further support the processing of the received packets and are described in detail below in conjunction with FIG. 4. The storage medium 116 also preferably stores statistical information 118 related to a plurality of packet analysis sections, which in one embodiment may include a plurality of packet analysis instructions used in the below described packet processing system.

In a typical implementation, the mitigation device 102 authenticates all external host devices 106 a, 106 b . . . 106 n before allowing the external devices to access the protected devices 108 within the protected network 100.

To protect against DoS attacks, the mitigation device 102 distinguishes between requests from legitimate hosts 106a-106n and attack traffic from attacking host 120 by performing an authentication procedure for new connection requests to a host device within the protected network 100. In one example of authentication, after receiving a TCP SYN packet from any of the external host devices 106a-106n, the mitigation device 102 extracts the sender's internet protocol address (or IP address) from the TCP SYN packet. The mitigation device 102 then sends a specific response back to the IP address (also referred to as host or source address) and waits for the external host device to respond with a correct reply. If the IP address of the external host device, such as attacking host 120, is not a legitimate address, then the external device 120 will not respond, or will respond incorrectly to the specific response from the mitigation device 102. If the IP address of external host device, such as host device 106a, is legitimate, then the external host device 106a will respond with the correct reply.

As noted above, typically, the mitigation device 102 may employ a plurality of different attack-detection and attack-prevention procedures configured to control access to the protected network 100. In some embodiments, the mitigation device 102 may be configured to prevent the protected network 100 compromise by unauthorized users through packet filtering, stateful inspection and rate limiting. Packet filtering requires the mitigation device 102 to maintain a list of unauthorized source addresses. In one embodiment, the mitigation device 102 tracks each host device trying to access the protected network 100 with a host table. The host table is a data structure that stores IP addresses of external devices attempting to connect to the protected network 100. The host table also includes authenticated external devices, the probabilistic data structures, as well as other information. The source addresses of incoming packets are checked against the list of authenticated external devices. Only packets originating from authorized source addresses are allowed entry into the protected network 100. However, packet filtering is time consuming and resource intensive and can act as a bottleneck to incoming traffic. More importantly, spoofed request packets are indistinguishable from legitimate traffic and effectively evade packet filtering.

Stateful inspection is another example of attack mitigation procedures. Stateful inspection requires the mitigation device 102 to keep track of outgoing service requests. Incoming responses are matched to the tracked requests to prevent unsolicited responses from entering the protected network 100. However, stateful inspection is also resource intensive and can fail when the state allocated for request tracking is exceeded. The tremendous amount of state information needed to detect every type of attack greatly limits system performance and precludes having a scalable solution (i.e., a solution that can scale to the order of tens of gigabits per second). Several reported instances of devices crashing during a DDoS attack in the recent past demonstrate the ease with which attack mitigation devices/systems can be overwhelmed, thereby defeating the purpose of having such a device in the network. The rapid response necessary to detect and mitigate DDoS attacks can degrade data path and CPU performance in the current model of security devices.

In the attack mitigation procedures described above, among others, adding CPU capacity or performing fewer operations on each packet would thereby effectively increase the capacity of the packet processing system to receive packets, especially in the face of a surge in incoming network traffic.

Advantageously, the embodiments disclosed herein offer a novel approach of performing analysis that can reduce the amount of analysis performed per-packet to identify a potential attack. As discussed further below, the attack mitigation device 102 is configured to utilize one or more statistical data structures to track whether a specific packet processing section (i.e., specific attack mitigation procedure) is effective for detection of specific attacks, such as DDoS attacks. In various embodiments, the statistical data structures, such as counters, enable the mitigation device 102 to track the effectiveness of each packet analysis section with a high degree of confidence and only utilize the attack detection methods that are likely to actually work with that specific DDoS attack, thereby reducing the time needed to process each packet and improving the overall effectiveness of packet processing system.

According to exemplary configuration illustrated in FIG. 1, the attack mitigation device 102 may comprise a Client Edge (CE) device. The CE device can provide entry points into the protected network 100. In alternative configuration, the attack mitigation device 102 may comprise a virtual device. In other words, at least some of the embodiments do not require the attack mitigation device 102 to be a physical hardware device or to be located in a particular part of the network infrastructure, as long as the attack mitigation device 102 can be in the path of the incoming traffic to the protected network 100.

Figure 2:
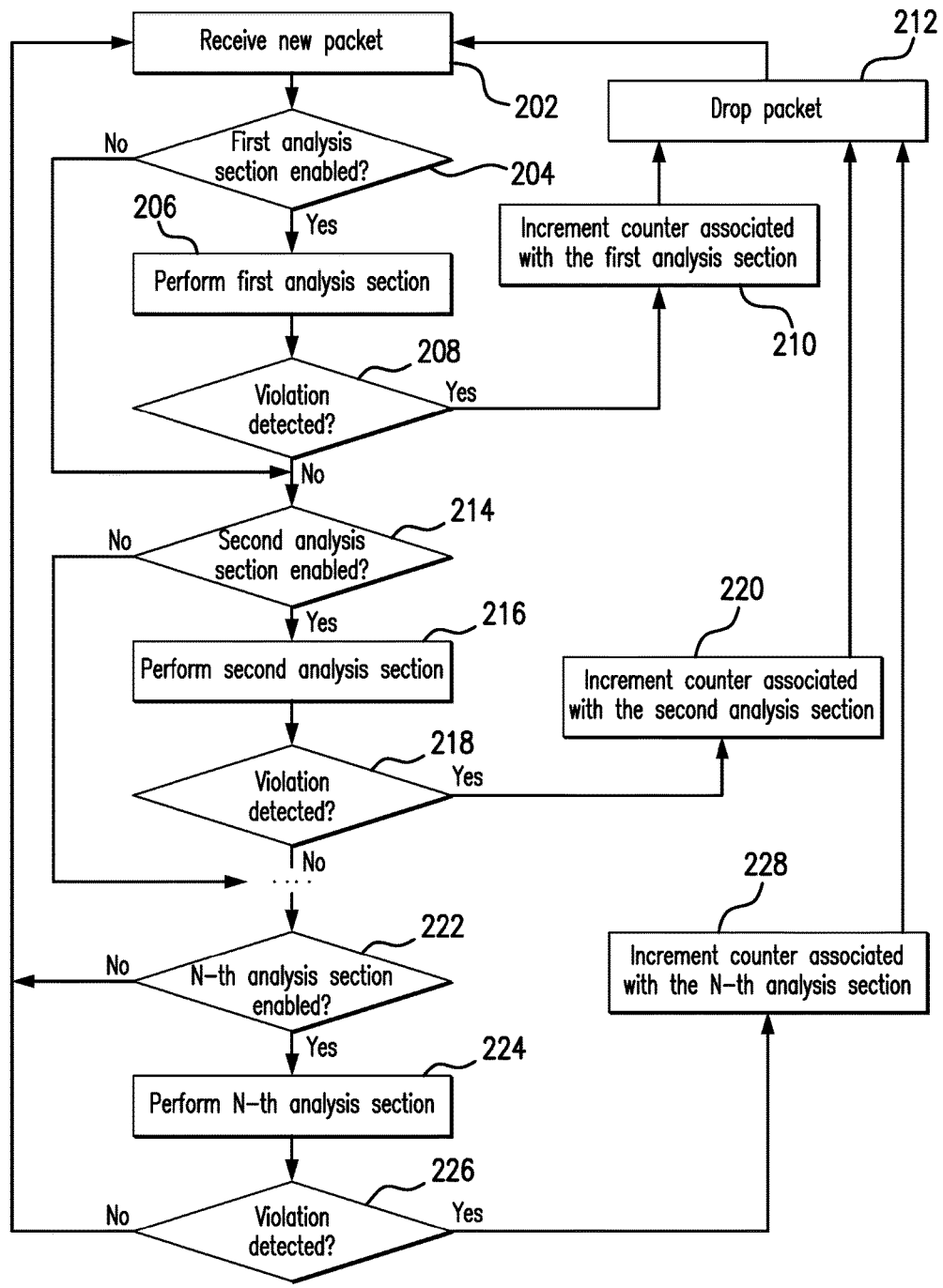
FIG. 2 is a flowchart showing the operation of the attack mitigation device to selectively perform various packet analysis sections, according to an embodiment of the present invention.
Figure 3:
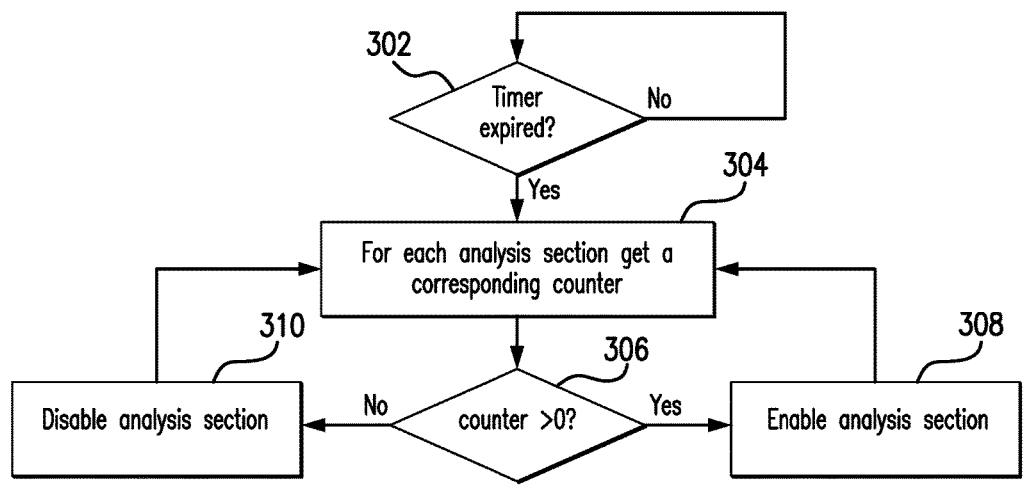
FIG. 3 is a flowchart showing the operation of the attack mitigation device to selectively enable/disable various packet analysis sections, according to an embodiment of the present invention.

FIG. 2 is a flowchart showing the operation of the attack mitigation device to selectively perform various packet analysis sections and FIG. 3 is a flowchart showing the operation of the attack mitigation device to selectively enable/disable various packet analysis sections, according to embodiments of the present invention. Before turning to descriptions of FIGS. 2 and 3, it is noted that the flow diagrams in FIGS. 2 and 3 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

Starting with FIG. 2, in step 202, attack mitigation device 102 receives network traffic data (packet) from one of the external devices 106. In the illustrated embodiments, the network traffic data is a packet used in a process for establishing a connection, transmitting data or shutdown a connection. For example, the received data can be a TCP packet (such as a SYN packet) that includes a TCP header. However, the received data can be other types of packet in other embodiments.

Next, the attack mitigation device 102 performs a plurality of processing analysis sections to determine if the received packet is associated with an attack (i.e., DDoS attack). In one embodiment, all incoming packets are inspected and validity tests are performed to ensure that the packets are well formed. For example, the validity tests determine if the packets are fragmented and need reassembly, if the length of the packet matches the length according to packet header, is the IP header checksum valid, is the TCP checksum valid, and if the packet version and header match, to list a few examples. Additionally, the mitigation device 102 also obtains the origination (host) and destination IP addresses from the packet header. If the packets do not pass all the validity checks then the packets are dropped and the connection is terminated by the mitigation device 102.

After passing the validity tests, predefined filter rules and policies may be applied at least in some embodiments. The predefined filter rules and policies are user-defined rules that dictate how specific network traffic is handled. For example, a filter rule could be created to always allow all traffic from specified servers or to always allow all network traffic that originates from a particular individual's host device IP address. Similarly, the predefined filter rules and policies are used to block all traffic from a specific IP address, a range of IP addresses, or any network traffic that arrives on specified ports to list a few other examples.

As discussed further below in conjunction with FIG. 3, the attack mitigation device 102 may periodically evaluate effectiveness of each of the packet analysis sections with respect to specific DDoS attacks and may selectively enable/disable some packet analysis sections based on results of the evaluation. According to an embodiment of the present invention, in step 204, the attack mitigation device 102 determines whether a first analysis section is enabled. In one example, the first analysis section may comprise one or more packet validity tests.

In response to determining that the first analysis section is enabled (decision block 204, "yes" branch), in step 206, the attack mitigation device 102 performs the first analysis section. The first analysis section may comprise one or more packet validity tests. As a non-limiting example, selected parameters (i.e., a source address) may be extracted from a header of the individual packet and the packet length for the corresponding packet is examined for validity using one of a set of packet validity tests, depending on the projected destination of the tested packet. When the packet validity test indicates that the packet length is valid (though not necessarily correct), a regular packet CRC (Cyclic Redundancy Check) calculation may be performed on the packet based on its assumed packet length. Depending on the results of the packet error detection processing (i.e., CRC calculation) as performed on a selected packet length, the packet validity is decided. For example, if a packet passes CRC calculation as performed on the packet length, then the currently processed packet is considered "valid". However, if the packet fails that validity test, then a plurality of additional CRC calculations may be performed. The resulting CRC calculation(s) for each packet are evaluated (e.g., whether the checksum matches for any of the calculations) to determine if the packet is valid (in which case a corresponding address extracted from the packet's header is stored in a "valid" list) or invalid (in which case the address is stored in an "invalid" list).

In step 208, the attack mitigation device 102 determines whether any violations are detected. In other words, if the first analysis section comprises packet validity tests, in step 208, the attack mitigation device 102 determines if any of the packet validity tests failed. At least in some embodiments, as part of the first packet analysis section process, the reasons of packet validity failures may be monitored or tracked so as to discontinue particular validity tests if they prove to be ineffective in detecting a particular attack. Furthermore, the attack mitigation device 102 may utilize statistical data structures, such as counters, to track various violations referred to hereinafter as "packet drop reasons".

If the attack mitigation device 102 detects any violations, such as failed validity tests, (decision block 208, "Yes" branch), the attack mitigation device 102 increments (in step 210) the counter associated with the first analysis section and/or increments one or more packet drop reason counters associated with particular validity tests that failed, such as, but not limited to an invalid IP header checksum counter and an invalid TCP checksum counter. Next, responsive to finding violations, in step 212, the attack mitigation device 102 drops the packet based on the processing performed by the first packet analysis section and returns to step 202 to process the next received packet.

According to an embodiment of the present invention, in response to detecting no violations in the first packet analysis section (decision block 208, "No" branch) or in response to determining that the first packet analysis section is disabled (decision block 204, "No" branch), in step 214, the attack mitigation device 102 determines whether a second analysis section is enabled. In one example, the second analysis section may comprise one or more predefined filter rules.

In response to determining that the second analysis section is enabled (decision block 214, "Yes" branch), in step 216 the attack mitigation device 102 performs the second analysis section. As noted above, in this example the second analysis section may comprise one or more predefined filter rules. For example, various predefined filter rules may analyze the source IP addresses, destination IP addresses, protocol type, source port numbers, and destination port numbers of the traffic packets, and may extract one or more TCP packets from the traffic packets based on the results of the analysis of the traffic packets. The attack mitigation device 102 may generate statistic information on the extraction of the TCP packets based on the results of the analysis of the traffic packets, and may store the generated statistics information in the storage medium 116.

In one embodiment, the attack mitigation device 102 may apply an exclusion filter to exclude one or more TCP packets that meet one or more exclusion rules and may apply a pass filter to pass one or more TCP packets that meet one or more pass rules. Furthermore, the attack mitigation device 102 may perform a predefined action on the TCP packets that meet specific exclusion rules or specific pass rules. For example, the predefined action may be 'drop,' 'forward,' 'modify,' 'dump,' or the like.

In step 218, the attack mitigation device 102 determines whether any violations are detected. In other words, if the second analysis section comprises predefined filter rules, in step 218, the attack mitigation device 102 determines if any of the predefined actions should be performed. Again, at least in some embodiments, as part of the second packet analysis section process, the reasons for predefined actions may be monitored or tracked so as to temporarily discontinue particular exclusion/pass rules if they prove to be ineffective in detecting a particular attack. Furthermore, the attack mitigation device 102 may utilize counters, to track packets that meet specific exclusion rules ("packet drop reasons") or specific pass rules ("packet pass reasons").

If the attack mitigation device 102 detects any required predefined actions, (decision block 218, "yes" branch), the attack mitigation device 102 increments the counter associated with the second analysis section and/or increments individual packet drop (or packet pass) counters associated with particular exclusion/pass rules (step 220). Next, responsive to finding violations, in step 212, the attack mitigation device 102 drops (or passes) the packet based on the processing performed by the second packet analysis section and returns to step 202 to process the next received packet.

According to an embodiment of the present invention, the attack mitigation device 102 may continue this process with remaining packet analysis sections. It should be noted that in various embodiments the packet may be processed by any number of packet analysis sections, until it reaches last processing section that is generically represented as N-th analysis section. At this point, in step 222, the attack mitigation device 102 determines whether the N-the analysis section is enabled. In one example, the N-th analysis section may comprise stateful inspection.

In response to determining that the N-the analysis section is enabled (decision block 222, "Yes" branch), the attack mitigation device 102 performs the N-th analysis section. In this example, in step 224, the attack mitigation device 102 may perform stateful application classification on the received packet. In this analysis section the attack mitigation device 102 may classify traffic based on multiple packets received from the beginning of a flow. In one embodiment, stateful classification section may use rules which need information on states for a previous packet (or packets) in a flow. The attack mitigation device 102 performs stateful classification to identify an application associated with the flow. Stateful classification may be based, for example, on packet pattern matching and decoding of protocols and their states. Stateful classification is also referred to as flow classification since it looks at a data stream of related packets (flow, session). Once the application is identified, the mitigation device 102 applies policies to downstream traffic. The predefined policies are user-defined rules that dictate how specific network traffic is handled.

In step 226, the attack mitigation device 102 determines whether any violations are detected. In other words, if the N-th analysis section comprises stateful classifier, in step 226, the attack mitigation device 102 determines if the applied policy dictates dropping packets. In this case, the attack mitigation device 102 may utilize counters, to track packets that meet specific stateful classification rules.

If the attack mitigation device 102 determines that the policy requires packet to be dropped (decision block 226, "yes" branch), in step 228, the attack mitigation device 102 increments the counter associated with the N-th analysis section and/or increments individual packet drop counters associated with particular stateful classification rules. Next, responsive to finding violations, in step 212, the attack mitigation device 102 drops (or passes) the packet based on the processing performed by the N-th packet analysis section and returns to step 202 to process the next received packet. It should be noted that since the N-th packet analysis section is the last one, the attack mitigation device returns to step 202 to process the next received packet even if the policy does not require the processed packet to be dropped (decision block 226, "No" branch).

According to an embodiment of the present invention, the attack mitigation device 102 periodically evaluates performance of utilized packet analysis sections. FIG. 3 is a flowchart showing the operation of the attack mitigation device to selectively enable/disable various packet analysis sections.

In some embodiments, the adaptive self-optimizing DDoS mitigation mechanism proposed herein creates and executes a refresh interval that spans a predetermined interval of time (e.g., 60 seconds). The refresh interval can be fixed or windowed. A fixed refresh interval is an interval that may run for a predetermined time (i.e., every 60 seconds). A windowed refresh interval is an interval that may complete over last-N packets in time (i.e., sliding window). The attack mitigation device 102 may then set a timer for the desired refresh interval and re-evaluate the performance, based on the refresh interval.

Referring now to FIG. 3, in step 302, the attack mitigation device 102 determines whether the current refresh interval has expired by using the set timer, for example. During the current refresh interval, network traffic may continue to be received and processed by the attack mitigation device 102 using currently enabled packet analysis sections. According to an embodiment of the present invention, initially, all sections are enabled and subsequently the enablement is automatically adapted to the results of the packet analysis.

In step 302, if the current refresh interval has expired (decision block 302, "Yes" branch), the attack mitigation device 102 proceeds to step 304, where processing effectiveness criteria is examined for each packet analysis section. In one exemplary embodiment, in step 304, the attack mitigation device 102 examines each and every counter associated with various packet analysis sections. In this manner, effectiveness of the countermeasures is favored over a thorough analysis during the attack.

In step 306, the attack mitigation device 102 determines whether the analysis section specific counter is zero at that time. If so, it means that the corresponding analysis section is not detecting any attack traffic by dropping packets. In this case (decision block 306, "No" branch), in step 310, the attack mitigation device 103 will temporarily disable the corresponding packet analysis section, since the attack detection was not triggered by this particular section. Furthermore, if the attack mitigation device 102 maintains individual counters associated with packet drop reasons such counters may also be evaluated in step 306. Thus, in alternative embodiment, in step 310, rather than disabling the entire analysis section, the attack mitigation device 102 may instead disable individual elements of that section (i.e., validity tests, filtering rules, etc. depending upon the analysis section involved) that were determined to be irrelevant in detecting a particular type of attack. However, in step 308, if at the time the refresh interval was expired, the evaluated counter is greater than zero (decision block 306, "Yes" branch), the attack mitigation device 102 must keep this analysis section enabled as this indicates with high probability a particular attack was detected by the corresponding packet analysis section. According to an embodiment of the present invention, the attack mitigation device 102 continues this process for each enabled section, after which it resets the counter to restart the refresh interval.

As with all processes described herein, variations are considered as being within the scope of the present disclosure. For instance, the process depicted in FIG. 3 may also include another timer to determine whether to re-enable all packet processing sections in accordance with changes in the origin of a DDoS attack over time. In addition, as noted, some of the currently disabled checks might become relevant after initial detection or might otherwise later become indicative of the existence of a DDoS attack. In one embodiment, this second time interval used for re-enabling all sections may correspond to a time interval of 300 seconds, for example. Advantageously, in this approach, the amount of resources spent on DDoS mitigation may be adjusted as necessary while a significant portion of the network traffic still would flow through the attack mitigation device 102.

Figure 4:
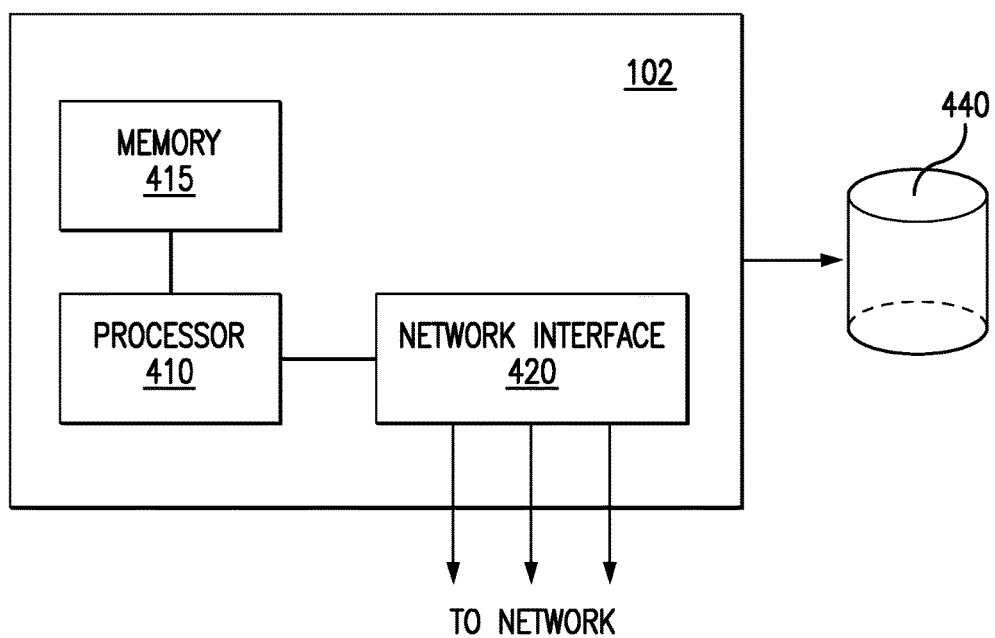
FIG. 4 is a block diagram of the attack mitigation device of FIG. 1, in accordance with an embodiment of the present invention.

With reference now to FIG. 4, illustrated is an exemplary and non-limiting block diagram of the attack mitigation device 102 constructed according to an illustrated embodiment. The attack mitigation device 102 is communicatively coupled to the protected network 100 and to the database 440 (i.e., storage medium 116 storing statistical information 118 related to a plurality of packet analysis sections), as shown in FIG. 4, and is at least configured to execute the method for mitigating network attacks as described in greater detail above. The attack mitigation device 102 preferably includes a processor 410 coupled to a memory 415 and a network-interface module 420. The network-interface module 420 allows the communication with the protected network 100. The processor 410 uses instructions stored in the memory 415 to execute attack detection tasks as well as to control and enable the operation of the network-interface module 420.

In summary, various embodiments of the present invention disclose a novel approach of performing packet analysis to identify a potential attack that can reduce the amount of analysis performed per-packet by employing various statistical data structures. The disclosed approach provides a number of advantages. In one aspect, software programming code embodying the present invention provides an ability to detect an attack by using detection methods that are highly likely to work with that particular attack rather than going through a series of tests and verification procedures one at a time. In another aspect, using this approach, the attack mitigation device 102 determines the likelihood of a particular analysis section being a successful one based on historical information. In the event of changes in the origin or nature of a DDoS attack over time, the attack mitigation device can adaptively self-optimize DDoS mitigation by falling back to iterating through other analysis sections that might become relevant over time. As yet another advantage, although the method depicted in FIGS. 3 and 4 is described with reference to the TCP validation procedures, it is not limited thereto. The disclosed processing functionality performed by the attack mitigation device 102 may be applicable to other protocols as well.

Most preferably, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for mitigating network attacks, the system comprising:
at least one attack mitigation device communicatively coupled to a protected network having one or more devices, wherein the at least one attack mitigation device is configured and operable to:
receive network data packets from external devices attempting to access protected devices in the protected network;
provide a first packet analysis section to perform a first analysis test on the received network data packets;
provide a second packet analysis section to perform a second analysis test on the received network data packets;
provide a third packet analysis section to perform a third analysis test on the received network data packets;
periodically analyze each of the first, second and third packet analysis sections, wherein each of the packet analysis sections includes analysis instructions and is associated with a counter configured to count packets dropped by a corresponding analysis section;
disable one or more of the first, second and third packet analysis sections for a predetermined period of time when its associated counter is less than a predetermined value;
analyze the received network data packets by utilizing only enabled one or more of the first, second and third packet analysis sections;
enable one or more of the disabled first, second and third analysis sections upon expiration of the predetermined period of time; and
analyze the received network data to perform packet error detection processing for each of the received network data packets.

2. The system as recited in claim 1, wherein:
the first packet analysis section performs a packet validity analysis on the received network data packets;
the second packet analysis section determines if the received network data packets satisfy predefined rules; and
the third packet analysis section performs a stateful inspection test on the received network data packets.

3. The system as recited in claim 1, wherein the at least one attack mitigation device is further configured to disable one of the first, second and third packet analysis sections in response to determining that the counter associated with the packet analysis section being disabled is equal to zero.

4. The system as recited in claim 1, wherein the at least one attack mitigation device is further configured to analyze the received network data packets to determine, for individual network data packets, whether the analyzed data packet meets a predefined risk criteria.

5. The system as recited in claim 4, wherein the at least one attack mitigation device is further configured to increment the counter associated with the packet analysis section that determined the individual data packet meets the predefined risk criteria.

6. The system as recited in claim 4, wherein the predefined risk criteria is indicative of a distributed denial of service (DDoS) attack.

7. The system as recited in claim 1, wherein the counter is associated with a packet drop reason for the dropped network data packet.

8. The system as recited in claim 1, wherein the at least one attack mitigation device is embedded in a virtual device.

9. A method for mitigating network attacks, the method comprising:
  receive network data packets in a mitigation device coupled to a protected network having one or more devices, the network data packets received from external devices attempting to access protected devices in the protected network;
  perform in a first packet analysis section a first analysis test on the received network data packets;
  perform in a second packet analysis section a second analysis test on the received network data packets;
  perform in a third packet analysis section a third analysis test on the received network data packets;
  periodically analyze each of the first, second and third packet analysis sections, wherein each of the packet analysis sections is associated with a counter configured to count packets dropped by a corresponding analysis section wherein the counter is associated with a packet drop reason for the dropped network data packet;
  disable one or more of the first, second and third packet analysis sections for a predetermined period of time when its associated counter is less than a predetermined value;
  analyze the received network data packets by utilizing only enabled one or more of the first, second and third packet analysis sections; and
  enable one or more of the disabled first, second and third analysis sections upon expiration of the predetermined period of time.

10. The method as recited in claim 9, wherein:
  the first packet analysis section performs a packet validity analysis on the received network data packets;
  the second packet analysis section determines if the received network data packets satisfy predefined rules; and
  the third packet analysis section performs a stateful inspection test on the received network data packets.

11. The method as recited in claim 9, wherein the at least one attack mitigation device disables one of the first, second and third packet analysis sections in response to determining that the counter associated with the packet analysis section being disabled is equal to zero.

12. The method as recited in claim 9, wherein the at least one attack mitigation device analyzes the received network data packets to determine, for individual network data packets, whether the analyzed data packet meets a predefined risk criteria.

13. The method as recited in claim 12, wherein the at least one attack mitigation device increments the counter associated with the packet analysis section that determined the individual data packet meets the predefined risk criteria.

14. The method as recited in claim 12, wherein the predefined risk criteria is indicative of a distributed denial of service (DDoS) attack.

15. The method as recited in claim 9, wherein the at least one attack mitigation device analyzes the received network data to perform packet error detection processing for each of the received network data packets.

16. The method as recited in claim 9, wherein the at least one attack mitigation device is embedded in a virtual device.

* * * * *